June 23, 1936.  L. E. LA BRIE ET AL  2,044,988
BRAKE
Filed Sept. 11, 1929    2 Sheets-Sheet 1

INVENTOR.
LUDGER E. LA BRIE
ADOLPH ROSNER
BY H. Q. Clayton
ATTORNEY

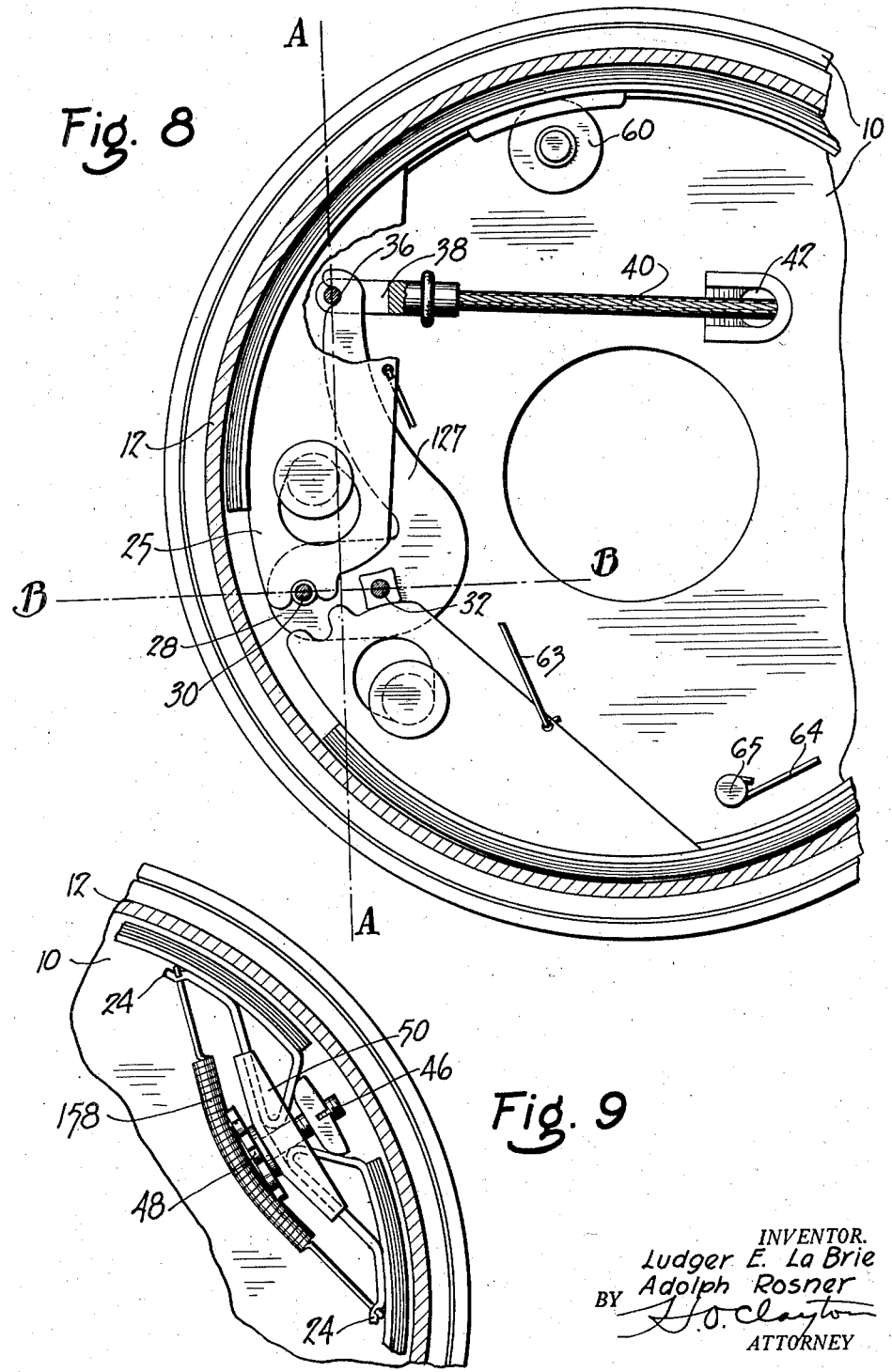

Patented June 23, 1936

2,044,988

UNITED STATES PATENT OFFICE 2,044,988

BRAKE

Ludger E. La Brie and Adolph Rosner, South Bend, Ind., assignors to Bendix Brake Company, South Bend, Ind., a corporation of Illinois Application September 11, 1929, Serial No. 391,714

9 Claims. (Cl. 188—78)

This invention relates to brakes and is illustrated as embodied in an internal expanding automobile brake of the full wrapping band type in which the friction means anchors at one end of the band with the drum turning in one direction and at the other end thereof with the drum turning in the opposite direction.

An object of the invention is to provide a very effective and simple type of band brake and to improve both the operating and adjusting means thereof.

Preferably the brake includes two interchangeable segments adjustably joined to provide an annular band member having separable ends at one side of the brake, which ends are adapted to be spread apart into drum engagement by a floating member acting as a lever having a portion thereof inserted between and contacting the separable ends of the band. It is of primary importance that the parts of the lever be so arranged with respect to the ends of the band to be separated and the direction of the power applying said lever be such that equal forces are transmitted to the respective ends of the band to apply the same to the drum.

A second very important feature of our brake resides in the provision of a novel adjustment to increase the overall length of the band, thus compensating for lining wear, and in our preferred embodiment we have disclosed juxtaposed separable ends of the segments of the band as being relatively moved by a radially movable wedge member contacting said ends, the reaction of said wedge being taken by a novel plate surrounding and guiding said ends.

A further feature of our invention relates to the positioning of the return springs of the brake to insure a centering of the same on its points of support and further acting upon the separable ends of the band to maintain the same in contact with their anchors during application of the brake; such a construction to obviate the objectionable so-called "click" of the parts during the anchoring operation.

Further features of the invention and desirable particular constructions relate to a novel form of adjustable eccentric stop to determine the inoperative position of the band; to a modified form of adjustment comprising a bolt member secured to one of the band segments and extending through a flange on the adjacent segment of the band, being adjustable with respect to the same; to details of various forms of the applying lever, and to various other details of construction and novel combinations of parts which will become manifest from the detailed description of the preferred embodiments of my invention disclosed in the accompanying drawings, in which:

Figure 1:
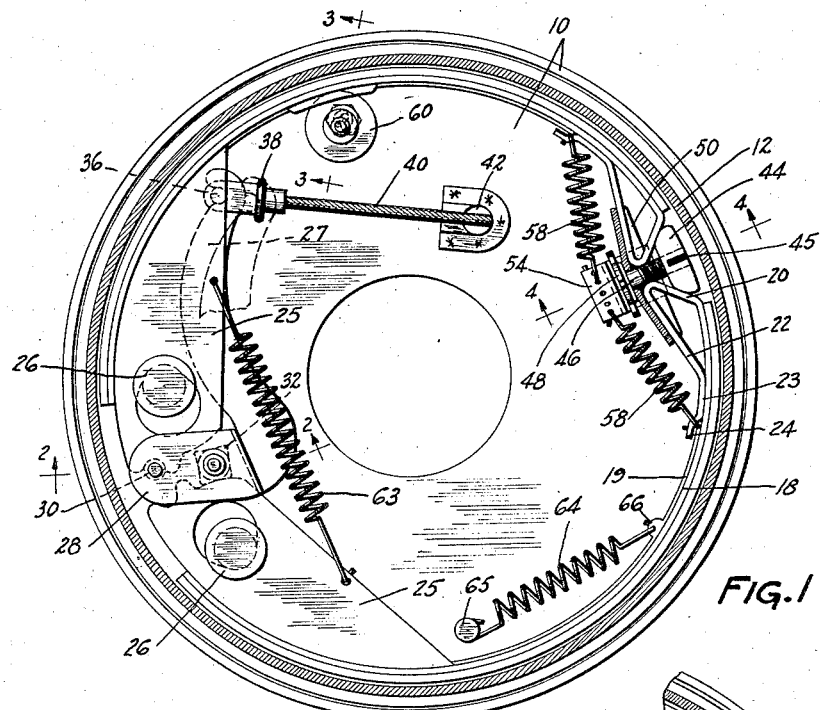
Figure 1 is a side elevation of our novel band brake, parts being shown in section.
Figure 7:
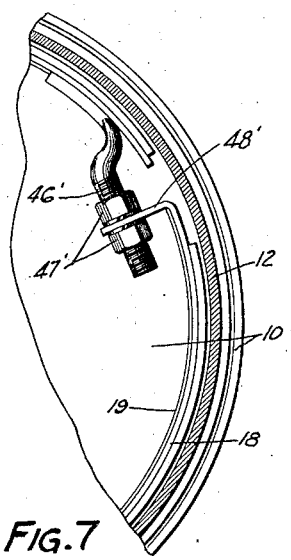

Figure 7 discloses a modified form of adjustment for the band;

Figure 8 is a view similar to Figure 1 on an enlarged scale showing an arrangement in which the thrusts on the ends of the friction band are exactly equal; and Figure 9 is a view corresponding to the left-hand portion of Figure 1 but showing a modification of the adjustment.

As disclosed in Figure 1, the parts of the brake are supported on a backing plate 10 within the rotatable brake drum 12 mounted upon the rotatable wheel (not shown). The brake proper preferably comprises interchangeable segments each comprising a lining covered flat band or rim portion 18 provided with a rib 19 and return bent at one pair of adjacent ends to provide inclined portions 20 and 22, the extreme ends of said return bent portions being secured to the inner face of the rim portions at 23 and thence outwardly projected to define lug portions 24. The remaining adjacent end portions of the segments of the brake are preferably reinforced by radially extending web portions 25 spot welded or otherwise permanently secured to the inner face of the rim portions and which web portions extend beyond the ends of the segments. The webs 25 are preferably slotted to receive anchor pins 26 secured to the backing plate.

According to one feature of our invention, the operating ends of the brake are positioned at one side of the same in or immediately adjacent a horizontally extending line passing diametrically therethrough and at that side of the brake which is toward the front of the vehicle. In order to spread the ends of the segments apart to apply the brake, I have provided a novel floating member acting as a bell crank lever and which is preferably fabricated from juxtaposed parallel stampings welded or otherwise permanently secured together to form a long vertically extending arm 27 of the bell crank interposed between the web of the upper segment and the backing plate. The member is preferably offset laterally of said arm and its parts spaced apart to provide the short horizontally extending arm 28 of the bell crank extending between the ends of the segments. A roller member 30 may be pivotally secured between the spaced portions of the short arm of the lever and immediately adjacent thereto there is provided a pivotally mounted generally rectangular thrust block 32. Thrust roller 30 is adapted to fit within a correspondingly shaped recess in the edge of the upper web portion 25 and the rectangular thrust block 32 is preferably slightly grooved on its sides to fit over a rounded portion on the inner edge of the lower radial web 25. The long vertically extending arm of the bell crank may be hooked at its end 36 to provide a connection with a fitting 38 secured to one end of a generally horizontally extending flexible cable member 40 extending through the backing plate 10 at 42 and connected to the service pedal by any approved type of power transmission linkage.

Figure 2:
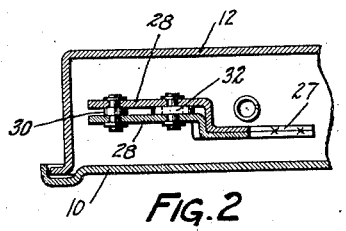
Figure 2 is a partial transverse section on the line 2—2 of Figure 1 showing, in more detail, one form of the applying lever.
Figure 4:
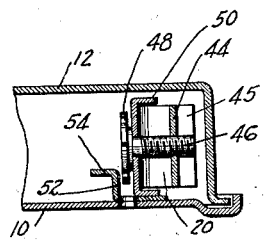
Figure 4 is a section taken on the line 4—4 of Figure 1 through the wedge adjustment for the band.
Figure 5:
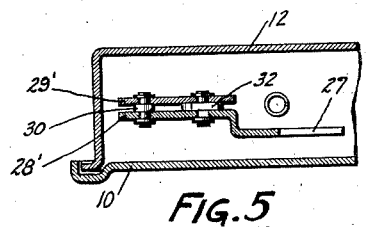
Figure 5 is a partial transverse section showing a modified form of lever member.

If desired, the floating lever member may be fabricated from a single stamping, as disclosed in Figure 5, offset at one end to provide one-half of the short arm of the bell crank lever 28'. The remaining portion 29' of the short arm of the lever may comprise a stamping arranged in parallel relation to the aforementioned arm 28' and spaced therefrom by the thrust elements 30 and 32 similar to the same elements disclosed in Figure 2.

A very important feature of our invention resides in so constructing, proportioning and positioning the separable ends, the thrust portions 30 and 32 of the bell crank, the contour of the bell crank itself, and lastly the direction of the cable to provide for equal forces to be transmitted to the respective ends of the band and to this end the joint between the lever end and the fitting 38 is so arranged that, with the brake applied, the same lies in or immediately adjacent a line normal to and bisecting a line joining the points of contact between the thrust elements 30 and 32 and the ends of the band. The line of action of the cable is such that the moment arms of the applying forces with respect to the two fulcrum points are equal to each other, resulting in balanced applying forces to the ends of the band. This insures equal braking with either forward or reverse movement of the vehicle.

In Figure 1 the joint is immediately adjacent this bisecting line, and the thrusts on the ends of the band are very nearly equal. By way of further illustration, we show in Figure 8 a construction in which the effective lever arm of floating lever 127, designated by the line "A", makes exactly a right angle with the above-described horizontal line, designated in this figure by "B", and which passes through the axes of the pivots 30—32 and which represents the effective points of thrust on the band. In this case the thrusts on the two ends of the band are exactly equal.

Another important feature of the invention resides in increasing the overall length of the two parts of the band to compensate for the lining wear ensuing with the brake operation. To this end there is provided a generally rectangularly shaped wedge member 44 slotted at 45 on its outer face and threadedly mounted upon a radially extending set screw 46, the side wedging surfaces of said member being preferably rounded, as disclosed in Figure 1, to insure at all times a line contact with the wedge surfaces 20 of the band segments. The inner end of the set screw is provided with a ratchet head 48 the teeth of which are accessible from outside the backing plate by virtue of a hole in the same. The reaction of the wedge in forcing the ends of the segments apart upon rotation of the screw is taken by a channel shaped stamping 50 sleeved on the set screw 46 in abutment with the ratchet head 48 and enveloping the return bent ends of the segments, all as clearly disclosed in Figure 1. The inner flange of the stamping preferably contacts one flange of a generally Z-shaped fitting 52 superposed upon and secured to the backing plate above the hole portion therein, the fitting being provided with a correspondingly shaped registering hole. The radially extending flange 54 of the fitting is preferably provided with a series of holes to accommodate the hook-shaped ends of return springs 58 secured at their other ends to the lug portions of the segments.

In operation to effect the adjustment, rotation of the ratchet head 48 by means such as a screw driver or other suitable tool inserted by the operator from outside the backing plate serves to rotate said screw to force the wedge inwardly, thus separating the ends of the segments to increase the overall length of the band. The wear of the brake lining is thus compensated for and the separable operating ends of the band maintained in a determined relation with respect to each other. The clamping action of the band ends serves to contract the split wedge tightly upon the screw, thus maintaining the adjustment.

There is also suggested, as disclosed in Figure 7, a modified form of adjusting means comprising a bolt member 46' curved at its end to provide a shank portion rigidly secured to the upper segment of the brake and adapted to be adjustably secured as by nuts 47' to a radially extending flange 48' extending as a bent portion from the body of the lower segment.

The springs 58 are preferably inclined inwardly toward the backing plate from the band ends thereof and further inclined radially as disclosed and as a consequence have components performing the two-fold function of drawing the brake toward the backing plate and bodily forcing the same against the anchor pins and the upper of said springs serves the additional function of drawing the brake against a novel adjustable stop 60 to be described hereinafter. In order to provide for this latter effect, it is necessary to insert the hooked end of the upper spring in the second hole from the end in the fitting, whereas the lower spring is hooked to the last hole, as disclosed in Figure 1. This gives a greater tension and therefore a greater load on the upper spring to perform this function.

If desired, and as illustrated in Figure 9 the springs 58 may be supplanted by a single spring 158 similar to the spring 63 connected to the webs 24 and drawing the ends of the band together to render the brake inoperative. With either return spring construction there is provided a spring 64 secured at its ends to the backing plate at 65 and lower segment at 66. This spring 64 serves to draw the entire band against the stop 60 and maintain the slotted portions of the webs 25 in engagement with the anchors during the initial application of the brake, thereby obviating the click which would ensue, should these slots leave the anchor pins. With the employment of the return springs 58, as shown in Figure 1, the radial component thereof serves to accomplish the same function, that is, maintaining the parts of the brake segments in constant engagement with the anchor pins to obviate the aforementioned anchoring click.

Figure 6:
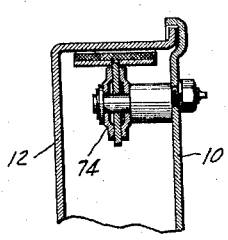
Figure 6 is a section similar to Figure 3 showing a modified form of adjustable eccentric stop.
Figure 3:
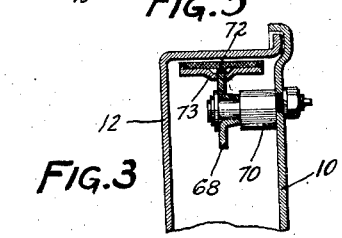
Figure 3 is a partial transverse section taken on the line 3—3 of Figure 1 disclosing in detail the structure of one form of eccentric stop.

According to one minor but important feature of our invention, we have provided the novel stop 60 previously referred to which, as clearly disclosed in Figure 3, comprises a disk 68 having a hub portion sleeved on a reduced portion of an eccentrically mounted cylindrical portion 70. The disk portion of the stop which is adjustably secured to the backing plate 10 contacts at its periphery with a relatively narrow strip portion 72 formed by striking out portion 73 from the body of the rim portion and which latter portions define guides for the disk member. As disclosed in Figure 6, we have provided a modified form of stop comprising juxtaposed parallel disks 74 in lieu of the single disk 68 of Figure 3, the intermediate disk of which is positioned within a slot in the inner periphery of the rim.

A very simple and effective brake is thus provided, balanced forces being transmitted to the ends of the brake segments by means of the angularly movable floating lever member. The direction of movement of the actuating cable member is such as to have no effect to shift the brake and, by virtue of the floating function of the lever member, unimpaired selective anchoring of the brake is effected.

While several illustrative embodiments of our invention have been described in detail, it is not our intention to limit the invention to those particular embodiments or otherwise than by the terms of the appended claims.

Certain features described but not claimed herein are claimed in our divisional applications Nos. 48,636, 48,637, and 48,638, filed November 7, 1935.

We claim:

1. A brake comprising, in combination, a rotatable drum, a friction device within the drum having separable ends and arranged to anchor at either of said ends according to the direction of rotation of the drum and means within the drum operable to apply the ends of the friction device against the same with substantially equal force, said means engaging the ends of the friction means at points spaced apart radially of the drum and having a part at one side of the brake arranged, when the brake is applied, in or immediately adjacent a line normal to a line joining the points of contact of said means with said separable ends.

2. A brake comprising, in combination, a rotatable drum, a friction device within the drum having separable ends and arranged to anchor at either of said ends depending on the direction of drum rotation, together with means within the drum operable to apply the ends of the friction device against the same, said means comprising a bell crank lever member, which lever member is so constructed and so arranged with respect to said separable ends as to impart thereto equal forces during said applying movement.

3. A brake comprising, in combination, a rotatable drum, an annular expansible friction device within said drum and having separable ends adapted to be forced apart to apply the friction device and means for separating said ends to apply said device comprising a floating lever member having a vertically extending arm actuated at its end by a tension element, the joint between said arm and tension element being arranged, when the brake is applied, in such a position with respect to the remaining parts as to effect substantially equal pressures to the respective separable ends with actuation of said lever.

4. A brake comprising, in combination, a rotatable drum, an expansible friction device within the drum having separable ends, together with means for separating said ends comprising a bell crank lever having a short arm extending between said ends and a long arm extending substantially normal to a line joining said ends, the extreme end of said long arm lying, with the brake applied, in or immediately adjacent with a line normal to and bisecting a line joining the points of contact between said short arm and the ends of said friction device.

5. A brake comprising, in combination, an expansible friction device having separable ends and means for separating said ends comprising a two-part lever member offset at one of its ends and the parts separated at said ends to provide a fork, together with means secured to said forked portion contacting the ends of said friction device.

6. A brake comprising, in combination, operating means comprising an angularly shaped lever member offset at one of its ends and having at said offset portion spaced thrust members secured to a plate member arranged in parallelism with said offset end.

7. In a brake, operating means comprising an angularly shaped lever member offset at one of its ends, spaced thrust members at said offset portion, and a plate member arranged in parallelism with said offset end and secured to the thrust members.

8. A brake comprising a drum, a backing plate at the open side of the drum and cooperating therewith to form a substantially closed brake chamber, friction means within the drum having adjacent separable ends provided with stiffening webs paralleling and spaced from the backing plate, anchorage means for said ends carried by the backing plate, a floating lever paralleling and close beside the backing plate and arranged generally along a chord of the drum and which is movable in the space between the backing plate and one of said webs and which has at one end thrust parts arranged between and disconnectedly engaging and which is supported by said ends, and a tension element connected to the other end of the lever and extending generally perpendicular to the lever close beside and thence through the backing plate.

9. A brake comprising a drum, a backing plate at the open side of the drum and cooperating therewith to form a substantially closed brake chamber, friction means within the drum having adjacent separable ends, anchorage means for said ends carried by the backing plate, a lever paralleling and close beside the backing plate and which has associated therewith at one end thrust parts arranged between and acting with substantially equal leverage upon said ends, said lever being arranged generally along a chord of the drum perpendicular to the line of contact of the thrust parts with said ends, and a tension element connected to the other end of the lever and extending generally perpendicular to the lever and parallel to said line of contact close beside and thence through the backing plate.

LUDGER E. LA BRIE.
ADOLPH ROSNER.